US00RE42777E

(19) United States
(12) Reissued Patent
Tuttle

(10) Patent Number: US RE42,777 E
(45) Date of Reissued Patent: Oct. 4, 2011

(54) ANTI-THEFT METHOD FOR DETECTING THE UNAUTHORIZED OPENING OF CONTAINERS AND BAGGAGE

(75) Inventor: John R. Tuttle, Longmont, CO (US)

(73) Assignee: Round Rock Research, LLC, Mt. Kisco, NY (US)

( * ) Notice: This patent is subject to a terminal disclaimer.

(21) Appl. No.: 12/057,270

(22) Filed: Mar. 27, 2008

Related U.S. Patent Documents

Reissue of:

(64) Patent No.: 5,831,531
Issued: Nov. 3, 1998
Appl. No.: 08/827,037
Filed: Mar. 25, 1997

U.S. Applications:

(63) Continuation of application No. 12/038,473, filed on Feb. 27, 2008, which is a continuation of application No. 08/421,571, filed on Apr. 11, 1995, now Pat. No. 5,646,592, which is a continuation of application No. 08/151,599, filed on Nov. 12, 1993, now Pat. No. 5,406,263, which is a continuation-in-part of application No. 07/921,037, filed on Jul. 27, 1992, now abandoned.

(51) Int. Cl.

| | |
|---|---|
| ***G08B 13/14*** | (2006.01) |
| ***G08B 21/00*** | (2006.01) |
| ***A45C 13/18*** | (2006.01) |
| ***A45C 13/10*** | (2006.01) |

(52) U.S. Cl. ..... 340/572.1; 340/572.7; 340/686.1; 340/540; 340/541; 340/652; 190/101; 190/120

(58) Field of Classification Search ..... 340/568.1, 340/568.2, 568.6, 568.7, 571, 572.1, 572.8, 340/572.9, 686.1; 190/101, 102, 119, 120
See application file for complete search history.

(56) References Cited

U.S. PATENT DOCUMENTS 3,426,166 A 2/1969 Canceill (Continued)

OTHER PUBLICATIONS

Tuttle, John, U.S. Appl. No. 07/921,037; "Anti-Theft Method for Detecting the Unauthorized Opening of Containers and Baggage", filed Jul. 27, 1992, now abandoned.

(Continued)

*Primary Examiner* — Jennifer Mehmood
(74) *Attorney, Agent, or Firm* — Lerner, David, Littenberg, Krumholz & Mentlik, LLP

(57) ABSTRACT

A simple trip-wire or magnetic circuit associated with a shipping container provides continuity, which is detected electrically. Simply, if continuity is disabled by a forced entry of the container, electrical detection means, such as a radio-frequency-identification (RFID) tag, will alert the owner or monitoring station. The trip-wire concept would require the replacing of a broken trip wire (resulting from forced entry), while the magnetic circuit concept can be reused repetitively. In a second embodiment a magnetic circuit and the detection device (RFID tag) are embedded into the shipping article during manufacturing. The preferred detection device, an RFID tag, could also be a battery backed transceiver type on which a replaceable or rechargeable battery could be mounted on the inside of the shipping container during manufacturing. The RFID tag would communicate with an interrogator unit, which could be connected to a host computer. The interrogator and/or the host computer and/or other alarm devices would then monitor the shipping container's status (opened or closed).

20 Claims, 8 Drawing Sheets

U.S. PATENT DOCUMENTS

| | | | | | |
|---|---|---|---|---|---|
| 4,117,468 | A | | 9/1978 | Vasquez | |
| 4,155,079 | A | * | 5/1979 | Chiu et al. | 340/571 |
| 4,262,284 | A | | 4/1981 | Stieff et al. | |
| 4,591,835 | A | * | 5/1986 | Sharp | 340/574 |
| 4,684,929 | A | | 8/1987 | Edwards et al. | |
| 4,908,606 | A | * | 3/1990 | Kevonian | 340/571 |
| 5,099,228 | A | * | 3/1992 | Israel et al. | 340/572.1 |
| 5,111,184 | A | | 5/1992 | Heaton et al. | |
| 5,126,719 | A | | 6/1992 | De Sorbo | |
| 5,169,188 | A | | 12/1992 | Kupperman et al. | |
| 5,189,396 | A | | 2/1993 | Stobbe | |
| 5,396,218 | A | | 3/1995 | Olah | |
| 5,406,263 | A | | 4/1995 | Tuttle | |
| 5,510,768 | A | * | 4/1996 | Mann | 340/571 |
| 5,646,592 | A | | 7/1997 | Tuttle | |
| 5,831,531 | A | | 11/1998 | Tuttle | |

OTHER PUBLICATIONS

Tuttle, John, U.S. Appl. No. 12/038,473; "Anti-Theft Method for Detecting the Unauthorized Opening of Containers and Baggage" filed Feb. 27, 2008.

USPTO Transaction History of U.S. Appl. No. 07/921,037, filed Jul. 27, 1992, entitled "Anti-Theft Method for Detecting the Unauthorized Opening of Containers and Baggage," now abandoned.

USPTO Transaction History of U.S. Appl. No. 08/151,599, filed Nov. 12, 1993, entitled "Anti-Theft Method for Detecting the Unauthorized Opening of Containers and Baggage," now U.S. Pat. No. 5,406,263.

USPTO Transaction History of U.S. Appl. No. 08/421,571, filed Apr. 11, 1995, entitled "Anti-Theft Method for Detecting the Unauthorized Opening of Containers and Baggage," now U.S. Pat. No. 5,646,592.

USPTO Transaction History of U.S. Appl. No. 08/827,037, filed Mar. 25, 1997, entitled "Anti-Theft Method for Detecting the Unauthorized Opening of Containers and Baggage," now U.S. Pat. No. 5,831,531.

USPTO Transaction History of U.S. Appl. No. 12/038,473, filed Feb. 27, 2008, entitled "Anti-Theft Method for Detecting the Unauthorized Opening of Containers and Baggage."

* cited by examiner

ANTI-THEFT METHOD FOR DETECTING THE UNAUTHORIZED OPENING OF CONTAINERS AND BAGGAGE

Matter enclosed in heavy brackets [ ] appears in the original patent but forms no part of this reissue specification; matter printed in italics indicates the additions made by reissue.

CROSS-REFERENCE TO RELATED APPLICATION

[This application] *More than one reissue application has been filed for the reissue of U.S. Pat. No. 5,831,531, which reissue applications are the intial reissue application Ser. No. 12/038,473, filed Feb. 27, 2008, and the present reissue continuation application Ser. No. 12/057,270, filed Mar. 27, 2008, which is a continuation application of U.S. patent application Ser. No. 12/038,473, filed Feb. 27, 2008, which is a reissue of U.S. Pat. No. 5,831,531, granted from U.S. patent application Ser. No. 08/827,037 filed Mar. 25, 1997, which* is a continuation [of] application *of U.S. patent application* Ser. No. 08/421,571 filed Apr. 11, 1995, now U.S. Pat. No. 5,646,592, *which is a continuation application of U.S. patent application Ser. No. 08/151,599 filed Nov. 12, 1993, now U.S. Pat. No. 5,406,263,* which is a continuation-in-part of application Ser. No. 07/921,037 filed Jul. 27, 1992, now abandoned.

FIELD OF THE INVENTION

This invention relates generally to anti-theft devices and in particular to a method for detecting unauthorized opening of containers and baggage.

BACKGROUND OF THE INVENTION

Protecting personal property has become a major industry from a security system standpoint. Security systems today can be as elaborate as those installed to protect banking institutions, equipped with video cameras, hooked-up as alarms to the local police station and security guards, or be as simple as a car alarm that is sounded when the door is forced open.

Likewise, the shipping industry is faced with an increasingly growing security problem in that containers, packages, baggage, luggage and mail (all of which may be referred to as simply "shipping container" hereinafter) are vulnerable to being opened by unauthorized personnel, who might steal the contents. As this problem increases it becomes necessary to protect these articles in order to protect the customer's property.

Due to the smaller size and larger quantity of the shipping articles mentioned above, the protection system used must be compact for concealment purposes, and somewhat simple in operation, thereby making them easy to produce and install in mass quantities while being fairly easy to monitor and operate.

The anti-theft method of the present invention conveniently addresses all of these issues to provide a workable and fairly inexpensive solution to securing safe transportation of articles shipped in some type of enclosed shipping container.

SUMMARY OF THE INVENTION

The present invention introduces a method for protecting against the unauthorized opening of shipping containers which is disclosed in the several embodiments following.

A first embodiment comprises a simple trip-wire or magnetic circuit that provides continuity, which is detected electrically. Simply, if continuity is disabled by a forced entry of the container, electrical detection means, such as a radio-frequency-identification (RFID) transceiver tag (or simply RFID tag), will alert the owner or monitoring station. The trip-wire concept would require the replacing of a broken trip wire (resulting from forced entry), while the magnetic circuit concept can be reused repetitively.

A second embodiment comprises the magnetic circuit approach of the first embodiment by having the magnetic circuit and the detection device embedded into the shipping article during manufacturing. The preferred detection device, and RFID tag, could also be a battery backed transceiver type on which a replaceable or rechargeable battery could be mounted on the inside of the shipping container during manufacturing. The RFID tag would communicate with an interrogator unit, which could be connected to a host computer. The interrogator and/or the host computer would then monitor the shipping container's status (opened or closed). The RPID tag could also have an output that changes state upon alarm, so that another device could be connected to indicate the alarm via sound, flashing lights or other means.

Implementation of the present invention will become readily understandable to one skilled in the art in the detailed descriptions that follow.

DETAILED DESCRIPTION OF THE PREFERRED EMBODIMENTS

Figure 1:
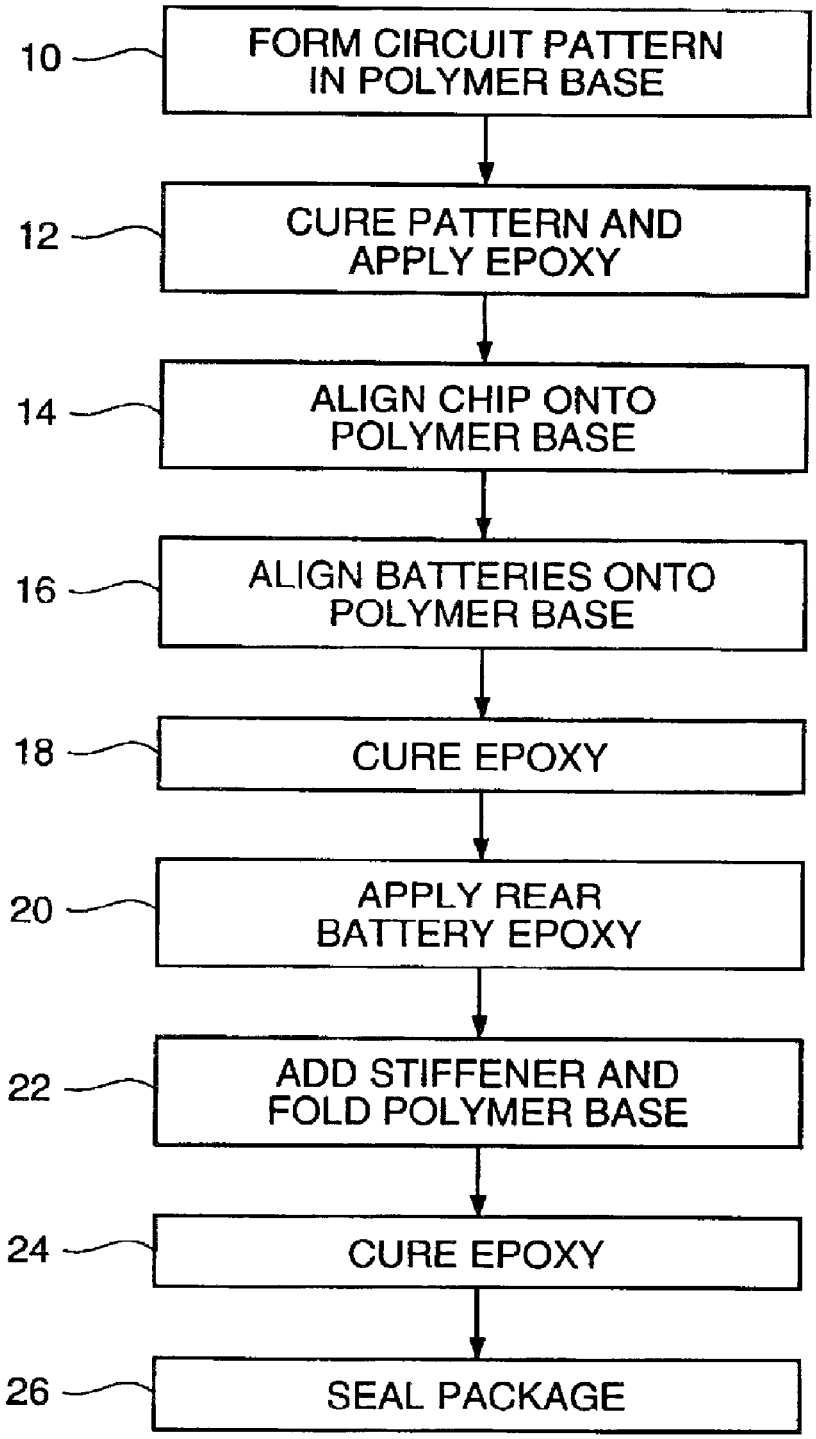
FIG. 1 is a process flow diagram showing the major processing stations and fabrication stages used in an overall manufacturing process of an RFID tag.

Referring now to FIG. 1, the process flow diagram shown in this figure includes nine (9) major processing stations or fabrication stages which are used in the overall manufacturing process steps that may be used to fabricate an RFID (radio frequency indentification) tag unit used in the anti-theft method of the present invention. These stages are described in more detail below with reference to FIGS. 2 and 3A through 3E. Initially, a circuit pattern is formed on a polymer base material in station 10, whereafter the circuit pattern is cured and an epoxy conductive material is applied to station 12 before aligning an integrated circuit chip onto the polymer base in station 14. Next, batteries (batteries added to the RFID package is optional) are aligned onto the polymer base in station 16 whereafter the epoxy is cured in station 18.

In the next step, the rear battery epoxy is applied in station 20 before adding a stiffener and then folding the polymer base over onto the top cover as indicated in station 22. The epoxy material is then cured in station 24 before providing a final sealing step in stage 26 to complete the package as described in more detail below.

Figure 2:
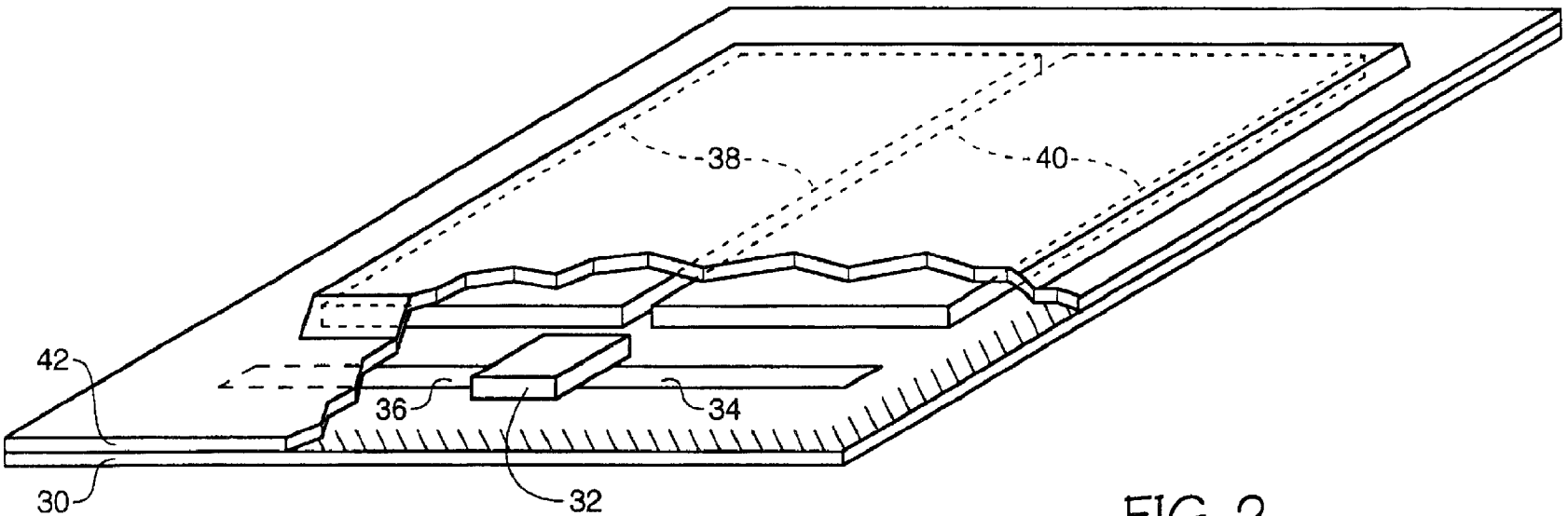
FIG. 2 is an enlarged perspective view of an RFID tag as constructed in accordance with the process flow of FIG. 1.

Referring now to FIG. 2, an RFID tag is depicted that includes a base support member 30 upon which an integrated circuit chip 32 is disposed on the near end of the device and connected to a dipole antenna consisting of metal strips 34 and 36 extending laterally from the chip 32 and typically screen printed on the upper surface of the base support member 30.

A pair of rectangular shaped batteries 38 and 40 are positioned as shown adjacent to the IC chip 32 and are also disposed on the upper surface of the base support member 30. The two rectangular batteries 38 and 40 are electrically connected in series to power the IC chip 32 in a manner more particularly described below. The device or package shown in FIG. 2 is then completed by the addition of an outer or upper cover member 42 which is sealed to the exposed edge surface portions of the base member 30 to thereby provide an hermetically sealed and completed package. The integrated chip 32 has transmitter, memory, logic, and receiver stages therein and is powered by the two batteries 38 and 40 during the transmission and reception of data to and from an interrogator to provide the interrogator with the various above identified information parameters concerning the article or person to which the RFID tag 30 is attached. The integrated chip may be designed to contain the needed circuitry one skilled in the art needs to accomplish the desired task and therefore may or may not contain all the circuitry listed above.

Figure 3A:
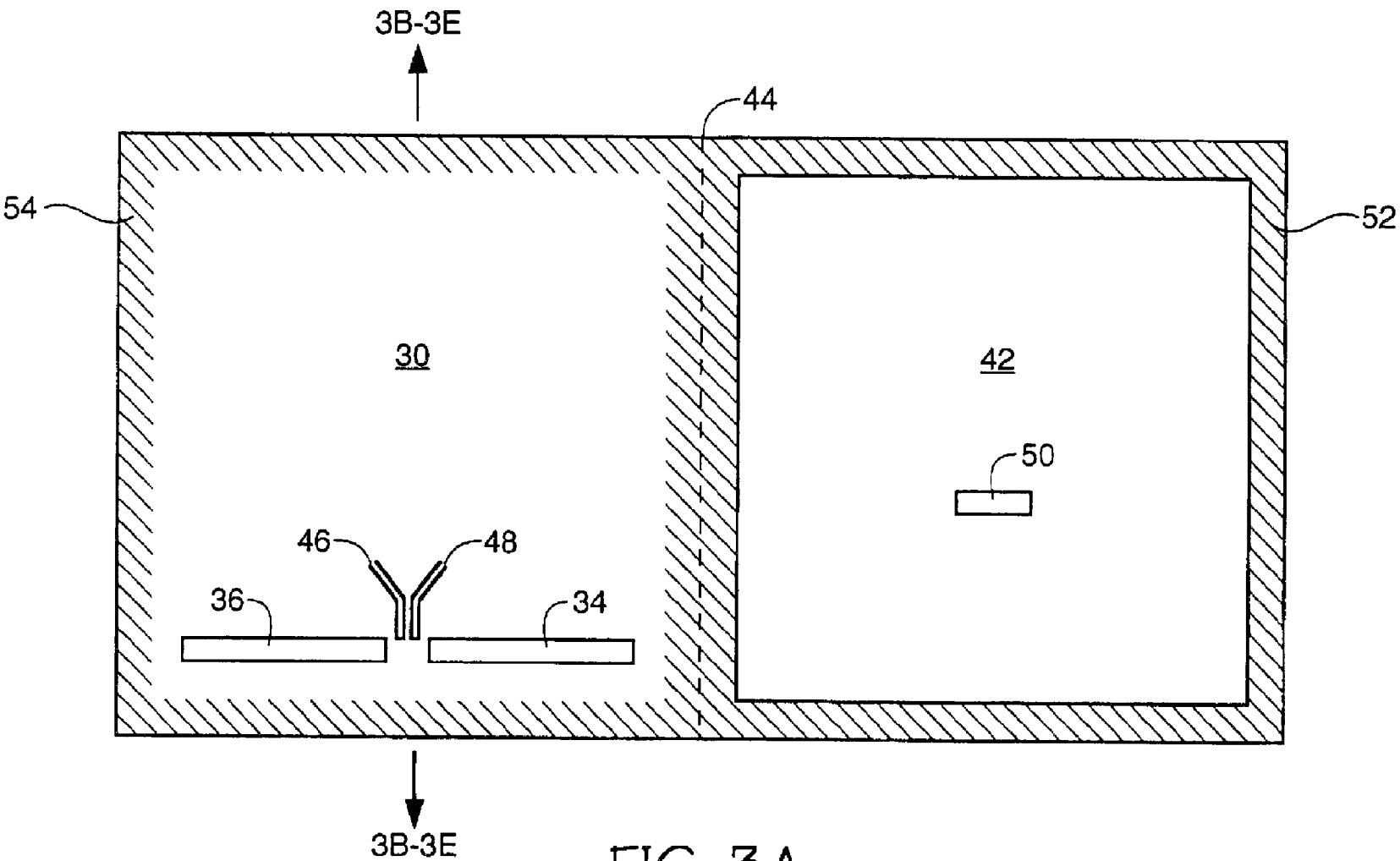
FIGS. 3A through 3E are cross sectional views of FIG. 2 showing the major processing steps used to construct the RFID tag.
Figure 3B:
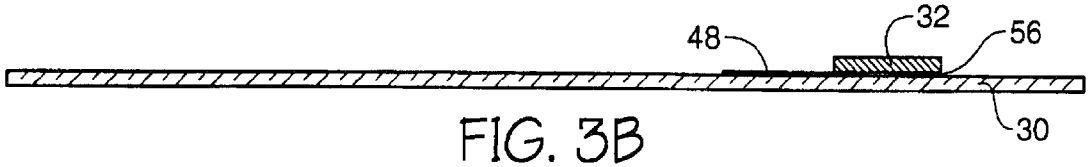

Referring now to FIG. 3A, there is shown a plan view of the geometry of the base support member 30 and the cover member 42 which, during the initial manufacturing stage, are joined at an intersecting line 44. The dipole antenna strips 34 and 36 shown positioned on each side of the IC chip 32, and the two conductive strips 46 and 48 serve to connect the tops of the batteries 38 and 40 into the IC chip 32. A conductive strip 50 is provided on the upwardly facing inside surface of the top cover 42, so that when the cover 42 is folded by 180° C., its outer boundary 52 is ready to be sealed with the outer boundary 54 of the base support member 30, and simultaneously the conductive strip 50 completes the series electrical connection used to connect the two batteries 38 and 40 in series with each other and further in the series circuit with the integrated circuit chip 32 through the two conductors 46 and 48.

Referring now to FIGS. 3B through 3E, FIG. 3B shows in cross section the IC chip 32 bonded to the base support member 30 by means of a spot button of conductive epoxy material 56. The conductive strip 48 is shown in cross section on the upper surface of the base support member 30. This figure would correspond generally to the fabrication stations 10, 12, and 14 in FIG. 1.

Figure 3C:
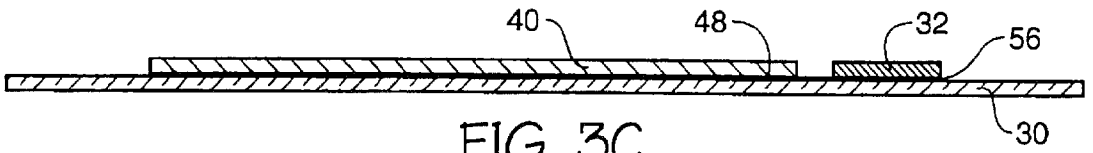

Referring now to FIG. 3C, the battery 40 is aligned in place as indicated earlier in FIG. 2 and has the right hand end thereof connected to the upper surface of the conductive strip 48. FIG. 3 would therefore correspond to stations 16 and 18 in FIG. 1.

Figure 3D:
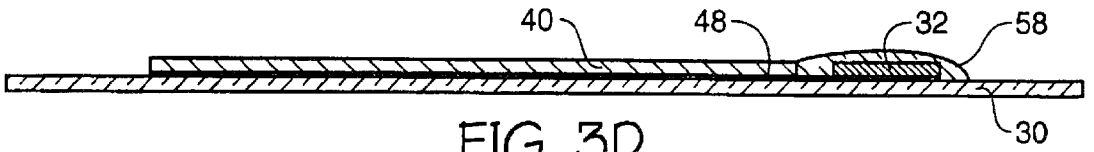

Referring now to FIG. 3D, a stiffener material 58 is applied as shown over the upper and side surfaces of the IC chip 32, to provide a desired degree of stiffness to the package as completed. FIG. 3D would therefore correspond to stations 20 and 22 in FIG. 1.

Figure 3E:
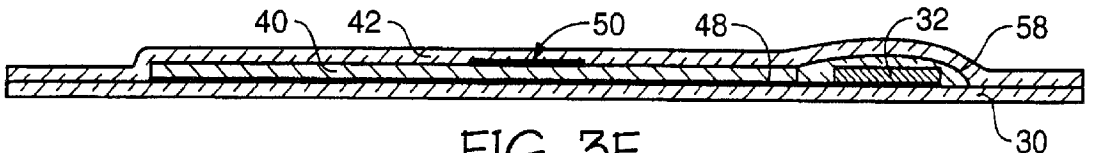

Next, a conductive epoxy is applied to the upper surfaces of the two batteries 38 and 40, and then the polymer base material 30 with the batteries thereon are folded over onto the cover member 42 to thus complete and seal the package in the configuration shown in FIG. 3E and corresponding to the remaining stations 24 and 26 in FIG. 1.

Figure 4:
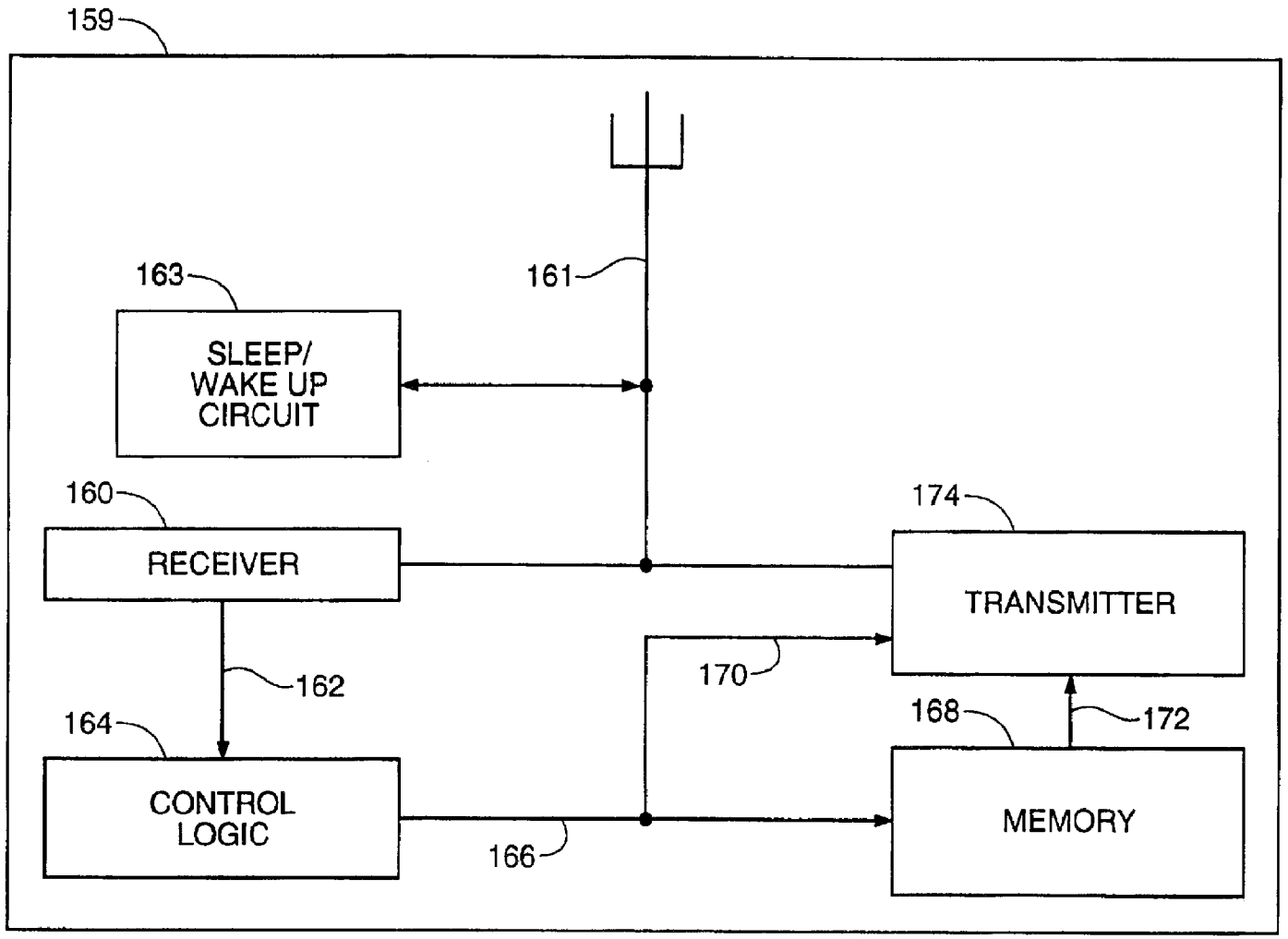
FIG. 4 is a functional block diagram showing the major signal processing stages within the RFID integrated circuit chip described herein and also within the interrogation unit used to interrogate the chip.

Referring now to FIG. 4, the rectangular outer boundary 159 in this figure defines the active area on the integrated circuit chip in which the integrated circuit transceiver has been formed using state of the art MOS planar processing techniques. These MOS planar processing techniques are well known in the art and are, therefore, not described in detail herein. Within the chip active area there is provided an RF receiver stage 160 which is connected to an antenna 161 and via one or more lines or circuit connections 162, to a control logic stage 164. The control logic stage 164 is in turn connected via one or more integrated circuit connections or lines 166 to a memory stage 168. The control logic stage 164 is further connected via a line 170 to a transmitter stage 174, and the memory stage 168 is also connected via line 172 to the trasmitter stage 174. The memory stage 168 is operative to provide input data to the transmitter stage 174 upon request, and functions in a manner operationally described in the example given below.

Figure 5:
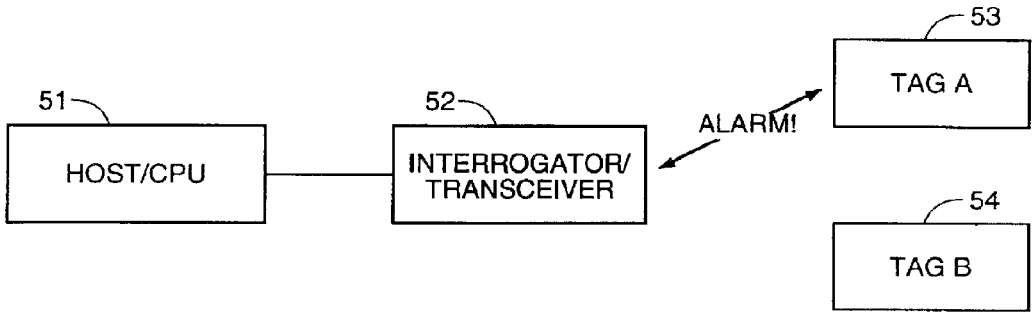
FIG. 5 is a functional block diagram showing the communication between several RFID tags and interrogation unit.

FIG. 5 is a functional block diagram showing a method of communication between several RFID tags and an interrogation unit in light of the anti-theft detection units later described in FIGS. 6 and 7. Referring now to FIG. 5, Host/CPU 51 interacts with interrogator/transceiver unit 52 and instructs unit 52 to interrogate RFID tags A (53) and B (54) for alarm data. If interrogator 52 receives no reply from either tag A or tag B the host 51 continues to instruct unit 52 to interrogate tags A and B as often as internal software demands it. However, if tag A responds (in an alarm state) the interrogator unit 52 communicates that information to the host 51 and an appropriate alarm is sounded to notify personnel that unauthorized opening of a container has just taken place.

Figure 6:
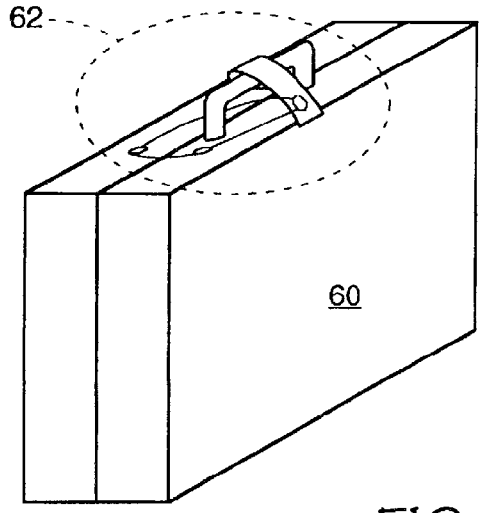
FIGS. 6, 6A and 6B depict a shipping container (luggage) on which a first embodiment of the present invention has been installed.
Figure 6A:
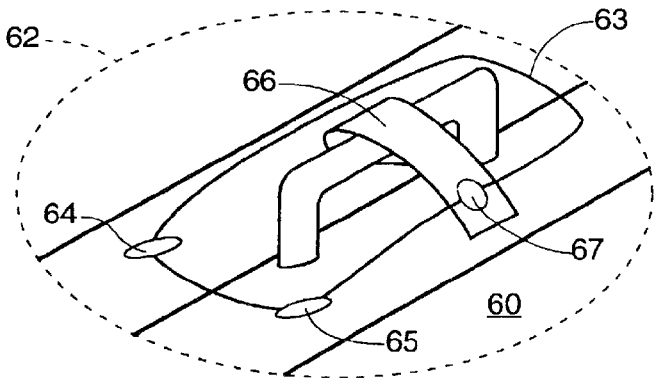
Figure 6B:
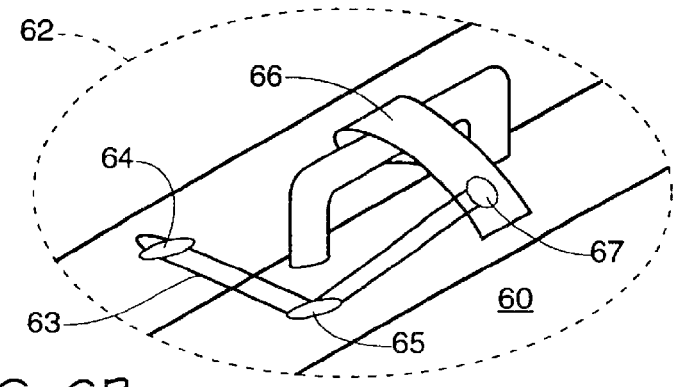

By using the communication approach taken in FIG. 5, a first embodiment of an "unauthorized opening detection device" is shown in FIG. 6 with variations of this embodiment shown in expanded views of FIG. 6 presented in FIGS. 6A and 6B.

Referring now FIG. 6, shipping container 60 (luggage in this case) is adorned with an "unauthorized opening detection unit" enclosed by outlined dashed circle 62. Expanded view 6A of dashed circle 62 shows a continuous wire 63 attached to both sides of container 60 at a first connection node 64, then to second connection node 65, continuing to RFID tag 67 (which is affixed to label 66) onto which wire 63 is attached. Wire 63 then completes its continuity path by attaching tag 67 to starting point node 64. If continuity is disrupted (wire 63 breaks by unauthorized opening of container 20) tag 67 would then signal the interrogator or some other device to sound an alarm and alert the owner or possibly security personnel in case of airline luggage transportation. Disarming the detection unit may be done by command from the interrogator or by the software at a given site, say at the container's destination, which may simply ignore the "opened" signal.

Expanded view of FIG. 6B shows a second means of installing a detection device wherein continuous wire 63 attaches to a first connection node 64, continues to a second connection node 65, routes to RFID tag 67 (which is affixed to label 66) and routes back to node 65 and finally to node 64.

Both attaching methods serve as examples of how the opening detection unit may be attached to containers or doors that open. It would be preferred to have the wire attached so that it is not easily detected by casual observance and not easily broken by accident. Tag 67 could be affixed to label 66 with tag 67 itself being adhered to a self-adhesive paper, such as stamp, and then applied to the label.

Figure 7:
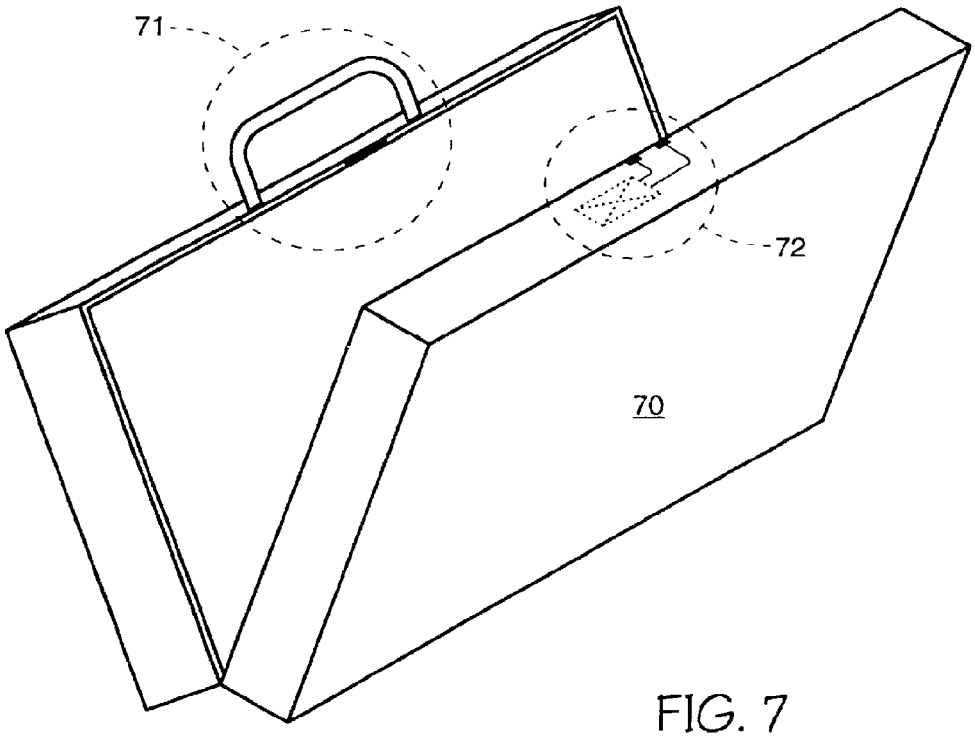
FIGS. 7, 7A and 7B depict a shipping container (luggage) on which a second embodiment of the present invention has been installed.

A second embodiment of an "unauthorized opening detection device" is shown in FIG. 7 with this embodiment shown in expanded views 7A and 2B.

Referring now to FIG. 7, shipping container 70 (luggage in this case) is adorned with an "unauthorized opening detection unit" enclosed by outlined dashed circles 71 and 72. In expanded view 7A of dashed circle 71, in the edge of container 70 a magnetic contact 73 is embedded. This magnetic contact 73 is preferably located in close proximity to a latch of container 70, or magnetic contact 73 may also function as half the latching mechanism to the container. In expanded view 7B of dashed circle 72, an RFID tag 78 is affixed to the top face of container 70. Electrical connections 74 extend from RFID tag 70 and attached to magnetic contacts 75 and 76. Magnetic contacts 75 and 76 may also function as the other half of the latching mechanism to the container. When container 70 is closed, contacts 75 and 76 mate with contact 73, thereby completing an electrical circuit. Unless disabled by the owner, should the container be forced open and continuity between contacts 73, 75 and 76 be disrupted, an alarm state bit is set in (in the alarm flagging circuitry) tag 78 which will signal the interrogator or other controlling device to sound an alarm to alert the owner or security personnel. Tag 78 will remain in an alarm state until the alarm state bit is reset by the interrogator/controlling unit.

Figure 7A:
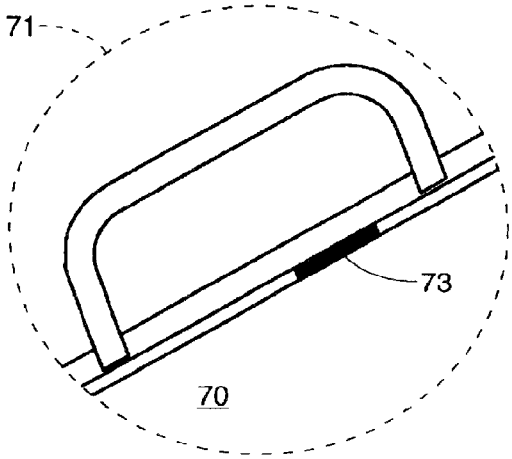
Figure 7B:
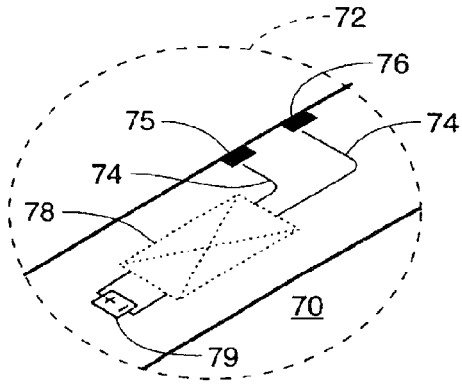

The detection device of FIG. 7A could be further enhanced by providing a replaceable battery 79, a power enabling means, for powering tag 78. It would be logical to have the battery only accessible from the inside of container 70 which would mean tag 78 would need to be embedded into container 70 and preferably embedded during the manufacturing of container 70. With a replaceable battery powered tag, tag 78 would now have the capability to send an alert signal to an interrogator unit or other device (such as a computer controlled transceiver unit) which would monitor the status of container 70 over its entire lifetime.

The methods of the embodiments discussed above, can easily be implemented into security systems. For example, by attaching the RFID tag and continuity completing circuitry to span between an entry/exit door and the framework supporting the door, unauthorized entry can now be monitored by activating the system when the door is to remain closed. Other such security schemes could also use the monitoring methods of the present invention.

It is to be understood that although the present invention has been described in several embodiments, various modifications known to those skilled in the art, such as applying these techniques to any kind of containers (mail, freight, etc.) or by various methods of attaching the detection device to the container, may be made without departing from the invention as recited in the several claims appended hereto.

I claim:

[1. For an apparatus having an aperture capable of being closed and opened by moving first and second closure members together and apart, respectively, an improved security device for signalling whether the aperture is opened, comprising:

(a) an elongated electrical conductor having first and second ends, the conductor extending between the two closure members and being attached to both the first closure member and the second closure member so that the two closure members cannot be moved apart more than a predetermined amount to open the aperture without breaking the conductor; and (b) an RFID transceiver, connected to the two ends of the conductor, including an electrical circuit for detecting when electrical continuity between the two ends of the conductor is broken and subsequently transmitting a radio frequency alarm signal.]

[2. A security device according to claim 1, wherein said apparatus is a container and the first and second closure members are external walls of the container.]

[3. A security device according to claim 2, wherein the RFID transceiver is embedded within a wall of the container.]

[4. A security device according to claim 1, wherein said apparatus is a suitcase and the first and second closure members are external walls of the suitcase.]

[5. For an apparatus having an aperture capable of being closed and opened by moving first and second closure members together and apart, respectively, an improved security device for signalling whether the aperture is opened, comprising:

(a) an electrical device, mounted on the apparatus adjacent the aperture, for detecting whether the aperture is open or closed; and (b) an RFID transceiver which transmits a radio frequency alarm signal after said device detects the aperture has been opened.]

[6. A security device according to claim 5, wherein the electrical device includes a magnet.]

[7. A security device according to claim 5, wherein the electrical device includes an elongated electrical conductor having first and second ends, the conductor extending between the two closure members and being attached to both the first closure member and the second closure member so that the two closure members cannot be moved apart a substantial amount to open the aperture without breaking the conductor.]

[8. A security device according to claim 5, wherein said apparatus is a container and the first and second closure members are external walls of the container.]

[9. A security device according to claim 8, wherein the RFID transceiver is embedded within a wall of the container.]

[10. A security device according to claim 5, wherein said apparatus is a suitcase and the first and second closure members are external walls of the suitcase.]

[11. For an apparatus having an aperture which is selectably closed and opened by moving first and second closure members together and apart, respectively, an improved security device for signalling whether the aperture is opened, comprising:

(a) an electrical device, mounted on the apparatus adjacent the aperture, for detecting whether the aperture is open or closed, wherein the electrical device includes:

(i) first and second electrical contacts mounted on the first closure member, and (ii) a third electrical contact mounted on the second closure member at a position such that, when the two closure members are moved together so as to close the aperture, the third electrical contact mates with both the first and the second contacts so as to complete an electrical continuity between the first and second contacts; and (b) an RFID transceiver which transmits a radio frequency alarm signal in response to said electrical continuity being broken.]

[12. A secure apparatus for signalling whether an aperture of the apparatus is opened, comprising:

an apparatus having first and second closure members and having an aperture capable of being closed and opened by moving the two closure members together and apart, respectively;

an electrical device, mounted on the apparatus adjacent the aperture, for detecting whether the aperture is opened; and an RFID transceiver which transmits an alarm signal after said device detects the aperture has been opened.]

[13. Apparatus according to claim 12, wherein the electrical device includes an elongated electrical conductor having first and second ends, the conductor extending between the two closure members and being attached to both the first closure member and the second closure member so that the two closure members cannot be moved apart more than a predetermined amount to open the aperture without breaking the conductor.]

[14. Apparatus according to claim 13, further comprising:

a hinge mounted on a first end of each closure member;

wherein the conductor extends between the two closure members at a second end of each closure member opposite the hinge.]

[15. Apparatus according to claim 14, further comprising:

a handle mounted on the second end of one of the closure members; and a strap encircling the handle;

wherein the RFID transceiver is mounted on the strap.]

[16. Apparatus according to claim 12, wherein:

the electrical device includes first and second electrical contacts mounted on the first closure member, and a third electrical contact mounted on the second closure member at a position such that, when the two closure members are moved together so as to close the aperture, the third contact mates with both the first and second contacts so as to complete an electrical continuity between the first and second contacts; and the RFID transceiver transmits said radio frequency alarm signal in response to said electrical continuity being broken.]

[17. Apparatus according to claim 16, wherein the first, second and third electrical contacts respectively comprise first, second and third magnetic contacts.]

[18. Apparatus according to claim 12, wherein the electrical device includes a magnetic device.]

[19. Apparatus according to claim 12, wherein said apparatus is a container and the first and second closure members are external walls of the container.]

[20. Apparatus according to claim 19, wherein the RFID transceiver is embedded within a wall of the container.]

[21. Apparatus according to claim 12, wherein:

said apparatus is a suitcase; and the first and second closure members are external walls of the suitcase.]

[22. Apparatus according to claim 12, wherein:

said apparatus is a doorway;

the first closure member is a door frame; and the second closure member is a door.]

[23. A method for signalling whether an aperture is opened, comprising the steps of:

providing an apparatus having first and second closure members and having an aperture capable of being closed and opened by moving the first and second closure members together and apart, respectively;

detecting whether the aperture is opened; and in response to detecting that the aperture is opened, transmitting a radio frequency alarm signal.]

[24. A method according to claim 23, wherein the detecting step comprises:

mounting adjacent the aperture an electrical detecting device having an electrical condition responsive to whether the aperture is opened; and detecting whether the aperture is opened by detecting the electrical condition of the detecting device.]

[25. A method according to claim 24, wherein:

the step of mounting an electrical detecting device comprises extending between the two closure members an elongated electrical conductor having first and second ends, and attaching the conductor to both the first closure member and the second closure member so that the two closure members cannot be moved apart more than a predetermined amount to open the aperture without breaking the conductor; and the step of detecting whether the aperture is opened comprises detecting whether electrical continuity between the two ends of the conductor is broken.]

[26. A method according to claim 24, wherein the step of mounting an electrical detecting device comprises mounting a magnet adjacent the aperture.]

[27. A method according to claim 23, wherein the providing step comprises:

providing a container having first and second external walls, wherein said apparatus is the container and said first and second closure members are the first and second external walls of the container, respectively.]

[28. A method according to claim 27, further comprising the step of:

embedding an RFID transceiver within a wall of the container;

wherein the transmitting step comprises the RFID transceiver transmitting the radio frequency alarm signal.]

[29. A method according to claim 28, further comprising the steps of:

mounting a replaceable battery within the container so as to be accessible only from the interior of the container; and connecting the battery to the RFID transceiver.]

[30. A method according to claim 27, wherein the step of providing a container comprises:

providing a suitcase as said container.]

[31. A method according to claim 23, wherein the transmitting step further comprises:

receiving radio frequency interrogation signals; and transmitting said radio frequency alarm signal only after receiving a radio frequency interrogation signal subsequent to said detecting that the aperture is opened.]

*32. A method for signalling whether an aperture is opened, comprising the steps of:*

*providing an apparatus having first and second closure members including at least a door, and having an aperture capable of being closed and opened by moving the first and second closure members together and apart to close and open the door, respectively;*

*after the door is closed, attaching an electrical detection device to the door, the detection device having an RFID device mounted via adhesive and having a wire arranged to form a circuit which is to be irreversibly disrupted if the door is opened, the RFID device to store information identifying the apparatus;*

*detecting whether the aperture is opened, based on whether the circuit is disrupted, using the RFID device;*

*interrogating a plurality of RFID transceiver tags for an alarm status using an interrogator unit that communicates with the RFID transceiver tags wirelessly via radio frequency interrogation signals; and*

*in response to detecting that the aperture is opened, transmitting the stored information identifying the apparatus in response to the radio frequency interrogation signals and transmitting a radio frequency alarm signal from the RFID transceiver tags to the interrogator unit if the aperture is detected to have been opened.*

*33. A method according to claim 32, wherein the wire is arranged across the closure members.*

*34. A method according to claim 32, further comprising communicating the alarm status to a host computer coupled to the interrogator if the interrogator receives the alarm signal from the RFID device.*

*35. A method according to claim 34, wherein the interrogator interrogates the RFID device in accordance with software running on the host computer coupled to the interrogator.*

*36. A method according to claim 32, further comprising continually interrogating the RFID device using an interrogator to continually monitor for an alarm.*

*37. A method according to claim 32, wherein detecting whether the aperture is opened comprises electrically detecting continuity between two electrical contacts.*

*38. A method according to claim 32, further comprising monitoring a status of the aperture as being either opened or closed via a host computer.*

*39. A method according to claim 32, wherein the apparatus comprises a shipping container.*

*40. A method according to claim 32, wherein the RFID device is hermetically sealed.*

*41. A secure container system for signalling whether an aperture of the apparatus is opened, comprising:*

*a container having first and second closure members and having an aperture capable of being closed and opened by moving the two closure members together and apart, respectively;*

*an electrical detection device, mounted on the apparatus adjacent the aperture, for detecting whether the aperture is opened, the electrical detection device comprises an RFID transceiver tag and an electrical circuit, the electrical circuit to be irreversibly disrupted when the aperture is opened to access interior of the container, the RFID transceiver tag sealed inside a package and attached to the container via adhesive, the RFID transceiver tag having an antenna and having memory to store identification information of the RFID transceiver tag and having a circuit to receive and transmit radio frequency signals via the antenna; and*

*an interrogator wirelessly coupled with the RFID transceiver tag via radio frequency signals, wherein in response to a command from the interrogator the RFID transceiver tag transmits the identification information of the RFID transceiver tag to the interrogator and transmits an alarm signal to the RFID interrogator after the electrical circuit detects the aperture has been opened.*

*42. A secure container system according to claim 41, wherein the electrical circuit extends between the closure members.*

*43. A secure container system according to claim 41, wherein the electrical detection device is powered by a battery.*

*44. A secure container system according claim 41, further comprising a host computer coupled to the interrogator to receive the alarm signal.*

*45. A secure container system according to claim 44, wherein the interrogator interrogates the RFID device in accordance with software running on the host computer coupled to the interrogator.*

*46. A secure container system according to claim 41, wherein the interrogator continually interrogates the RFID device to continually monitor for an alarm.*

*47. A secure container system according to claim 41, wherein the RFID transceiver tag electrically detects continuity between two electrical contacts to detect whether the aperture is opened.*

*48. For a secure container having an aperture capable of being closed and opened by moving first and second closure members together and apart, respectively, an improved security device for signalling whether the aperture is opened, comprising:*

*(a) an electrical device, mounted on the apparatus adjacent the aperture, for detecting whether the aperture is open or closed, the electrical device comprising a circuit to be irreversibly disrupted when the aperture is opened to access interior of the secure container; and*

*(b) an RFID transceiver tag sealed inside a package and attached to the secure container via adhesive, the RFID transceiver tag coupled to the electrical device to determine whether the circuit is disrupted, the RFID transceiver tag having an Integrated Circuit (IC) chip and an antenna, the IC chip having memory to store identification information of the RFID transceiver tag and having a circuit to receive and transmit radio frequency signals via the antenna, wherein when an interrogation command is received via the antenna, the RFID transceiver tag transmits the identification information of the RFID transceiver tag and transmits a radio frequency alarm after the electrical device detects the aperture has been opened.*

*49. A security device according to claim 48, wherein the circuit spans the closure members.*

*50. A security device according to claim 49, wherein the electrical detection device is powered by a battery.*

*51. A security device according to claim 50, wherein the RFID transceiver tag electrically detects continuity of the circuit to detect whether the aperture is opened.*

* * * * *